US007568670B2

(12) United States Patent
Wang

(10) Patent No.: US 7,568,670 B2
(45) Date of Patent: Aug. 4, 2009

(54) FLEXIBLE MOUNTING DEVICE FOR VIDEO/MAP DISPLAY

(75) Inventor: David Wang, Belmont, CA (US)

(73) Assignee: SiRF Technology Holdings, Inc., San Jose, CA (US)

( * ) Notice: Subject to any disclaimer, the term of this patent is extended or adjusted under 35 U.S.C. 154(b) by 0 days.

(21) Appl. No.: 11/383,261

(22) Filed: May 15, 2006

(65) Prior Publication Data

US 2007/0262216 A1    Nov. 15, 2007

(51) Int. Cl.
*A47G 29/00* (2006.01)
(52) U.S. Cl. .............. 248/205.3; 248/205.4; 248/206.2; 248/309.4
(58) Field of Classification Search .............. 248/205.3, 248/205.4, 205.5, 205.6, 206.2, 309.1, 309.3, 248/309.4, 921, 467, 104, 206.5
See application file for complete search history.

(56) References Cited

U.S. PATENT DOCUMENTS

| 4,390,576 | A | * | 6/1983 | Hutter, III | .................. | 428/40.1 |
| 5,033,528 | A | * | 7/1991 | Volcani | ...................... | 160/351 |
| 5,899,956 | A | | 5/1999 | Chan | | |
| 6,840,485 | B2 | * | 1/2005 | Richter | ..................... | 248/311.2 |
| 6,861,991 | B2 | | 3/2005 | Mueller | | |
| 6,939,155 | B2 | | 9/2005 | Postrel | | |
| 2003/0218105 | A1 | * | 11/2003 | Sones et al. | .................. | 248/104 |
| 2004/0047052 | A1 | * | 3/2004 | Zadro | .......................... | 359/855 |
| 2005/0049474 | A1 | * | 3/2005 | Kellogg et al. | .............. | 600/372 |
| 2005/0088812 | A1 | * | 4/2005 | Hillman et al. | ............. | 361/683 |
| 2005/0286148 | A1 | * | 12/2005 | Lee et al. | ..................... | 359/879 |
| 2006/0131467 | A1 | * | 6/2006 | Wang | ..................... | 248/276.1 |

FOREIGN PATENT DOCUMENTS

| DE | 4401176 | 7/1994 |
| JP | 8159139 | 6/1996 |
| WO | WO 98/17531 | 4/1998 |

* cited by examiner

*Primary Examiner*—Ramon O Ramirez
(74) *Attorney, Agent, or Firm*—Pillsbury Winthrop Shaw Pittman LLP

(57) ABSTRACT

Flexible mounting devices for navigational/entertainment displays, especially for in-vehicle use, are described herein. In an embodiment, the flexible mounting device comprises a flexible gooseneck, a magnetic base magnetically attached to a front end of the gooseneck for holding a display, and a windshield suction attached to a back end of the gooseneck for providing windshield support from the rear by suctioning to the windshield of a vehicle. In another embodiment, the flexible mounting device comprises a flexible neck, which may be firmly attached to the dashboard of a vehicle with a sticky gel pad. The mounting device also comprises a counter weight attached to a back end of the flexible neck. The display is fixed to a front end of the flexible neck such that the display protrudes beyond the dashboard. The counter weight at the back end of the flexible neck counter balances the weight of the display at the front end, and thereby helps to provide a stable support.

10 Claims, 5 Drawing Sheets

FLEXIBLE MOUNTING DEVICE FOR VIDEO/MAP DISPLAY

FIELD OF THE INVENTION

The present invention relates generally to mountings for video displays, and more particularly, to mounting devices for mounting in-vehicle video displays including navigation maps.

BACKGROUND OF THE INVENTION

Present day automobiles are using more and more electronics for entertainment and navigational purposes. This has given rise to various types of display devices mounted at various locations in the vehicle. These mountings strongly depend upon the type of application. For example, in the case of a large vehicle, a big display for entertainment purposes may be needed. On the other hand, a driver may prefer a smaller map display conveniently located on the dashboard for navigational purposes and entertainment purposes when not driving. In some cases, a single display may be used for both map viewing by the driver and video viewing by the co-passenger or driver at rest. This is because the navigational assistance provided by the display is not continuously required by the driver, and is only required for short time instances. Further, requirements on display position may be different during driving and resting. The portability of the display between different vehicles or out of vehicle is also a desirable attribute. The viewing angle range is important in many situations. Further, the controls of the display must not be confused with other controls which may happen when the display controls are located with other controls in the same area. When a support is provided on the dashboard of an vehicle or in the cockpit of an aircraft, it is necessary for the support to be able to be folded and kept away when not in use.

Most present day display devices used in automobiles are fixed on the dashboard along with other entertainment devices like FM radio, CD player, etc. The driver does not have the option of changing position or viewing angle and these factors limit the usefulness of such display devices. Recently, some display mountings have addressed these requirements. The European Patent WO/9817531 discloses a mount used in the cockpit of an aircraft. However, the mount is not flexible and cannot be used on vehicle dashboards. Japanese Patent JP8159139 discloses another type of mount for GPS sensors. However, the mount is not flexible. A foam and magnetic material based mount is disclosed in European Patent DE4401176, but it is also not flexible and has to be fixed to a body using nails or screws. U.S. Pat. Nos. 5,899, 956, 6,861,991, and Published U.S. Application No. 2004/0121645 disclose GPS mount relating only to GPS antennas.

Accordingly, there is a need for flexible mounting devices for navigational/entertainment displays, especially for in-vehicle use.

BRIEF SUMMARY OF THE INVENTION

The present invention provides flexible mounting devices for navigational/entertainment displays, especially for in-vehicle use. The flexible mounting devices allow a display to be mounted to a vehicle such that the display can be easily rotated in different directions and the mounting height can be adjusted. Further, the flexible mounting device can be easily turned in different directions, and can be easily folded and packed away.

In an embodiment, a flexible mounting device comprises a flexible gooseneck, which is flexible enough to turn to different directions and heights. The mounting device further comprises a magnetic base magnetically attached to a front end of the gooseneck and with suitable holders for ensuring that the display is properly fixed to the mounting device. The mounting device further comprises a windshield suction attached to a back end of the gooseneck for providing windshield support from the rear by suctioning to a windshield.

In another embodiment, a flexible mounting device comprises a flexible neck, which may be firmly attached to the dashboard of a vehicle and therefore does not require windshield support. The mounting device further comprises a counter weight attached to a back end of the flexible neck for counter balancing the weight of the display fixed to a front end of the flexible neck. A sticky gel pad is used for holding the display on the mounting device and/or fixing a portion of the flexible neck to the dashboard.

DETAILED DESCRIPTION OF THE PREFERRED EMBODIMENTS

Figure 1:
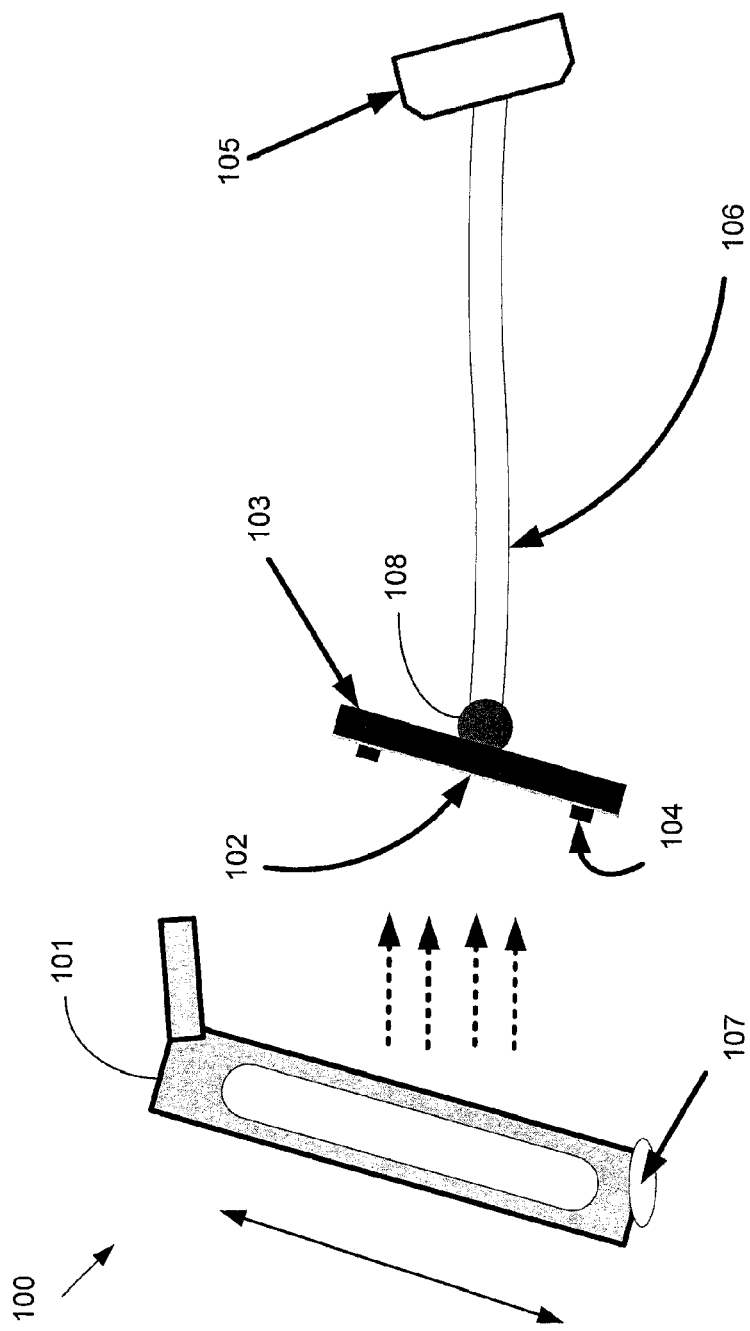
FIG. 1 shows a windshield supported mounting device accounting to an embodiment of the invention.

FIG. 1 shows a windshield supported mounting device 100 according to an embodiment of the invention. The mounting device 100 comprises a flexible gooseneck 106, a strong windshield suction 105 attached to one end of the gooseneck 106, and a gooseneck head 108 attached to the other end of the gooseneck 106. The flexible gooseneck 106 can preferably be bent in any direction in three dimensional space. The windshield suction 105 can be suctioned to the windshield of a vehicle for holding the mounting device 100 onto the windshield. The gooseneck head 108 is preferably spherical in shape, but may also be cylindrical. The mounting device 100 further comprises a strong magnetic base 103 that can be magnetically attached to the gooseneck head 108. The magnetic base 103 preferably comprises a strong magnetic material that can hold onto to the gooseneck head 108 by magnetic force. When magnetically attached to the gooseneck head 108, the magnetic base 108 can pivot and rotate about the gooseneck head 108.

Also shown in FIG. 1 is a display or display holder 101 that can be mounted to a vehicle with the mounting device 100. A sticky gel pad material 102 is firmly pasted on the magnetic base 103 for fixing the display 101 to the base 103. The sticky gel pad material 102 is well suited for an automobile environment (e.g., can withstand vibrations). Other types of adhesives may also be used for fixing the display 101 to the magnetic base 103. In the preferred embodiment, the mounting device 100 includes interlocking blocks 104 firmly attached to the magnetic base 103. The interlocking blocks 104 can fit into grooves (shown in FIG. 5) on the back of the display 101 to ensure proper positioning of the display 101 on the magnetic base 103 and to adjust the mounting height of the display 101. The grooves and interlocking blocks are discussed in more detail below with reference to FIGS. 5 and 6.

The display 101 may comprise a built-in GPS receiver for providing navigational assistance to a driver. The display 101 may also comprise a radio, a music player, or a video player for entertainment purposes. The display 101 may also connect to other electronic devices via a wire or wireless connection.

Figure 2:
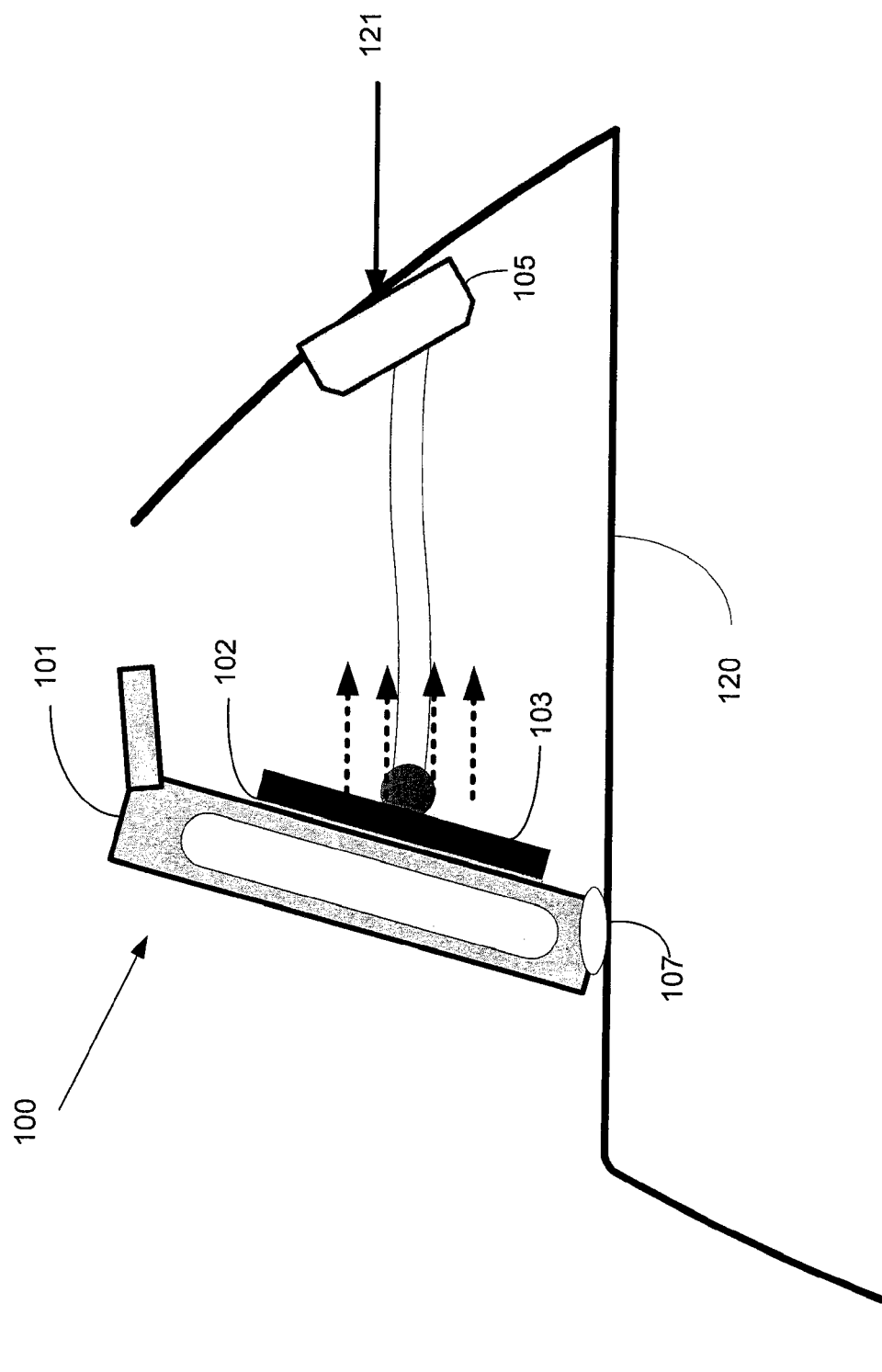
FIG. 2 shows the windshield supported mounting device attached to the windshield of a vehicle by a windshield suction.

FIG. 2 shows the windshield supported mounting device 100 attached to the windshield 121 of a vehicle for mounting the display 101 to the vehicle. The suction 105 is firmly suctioned to the windshield 121 to provide windshield support. The display 101 is fixed to the magnetic base 103 with the sticky gel pad material 102 in between. The interlocking blocks 104 are aligned with and fitted into the grooves of the display 101. Further, the display 101 rests on the dashboard 120 of the vehicle for additional support. Preferably, a rubber pad 107 is provided on the bottom of the display 101 to prevent the display from slipping on the dashboard 120.

The windshield supported mounting device 100 allows the angle of the display 101 to be easily adjusted by bending the flexible gooseneck 106 and/or pivoting the magnetic base 103 about the gooseneck head 108. For example, this allows a driver to angle the display 101 to view a map for navigational assistance, and a passenger to quickly re-angle the display 101 to view videos when the driver is not using the display 101. Thus, the mounting device 101 allows the driver and the passenger to share the same display 101 and to quickly angle the display 101 for good viewing. Further, the magnetic base 103 facilitates quick release of the display 101 from the mounting device 100.

Figure 3:
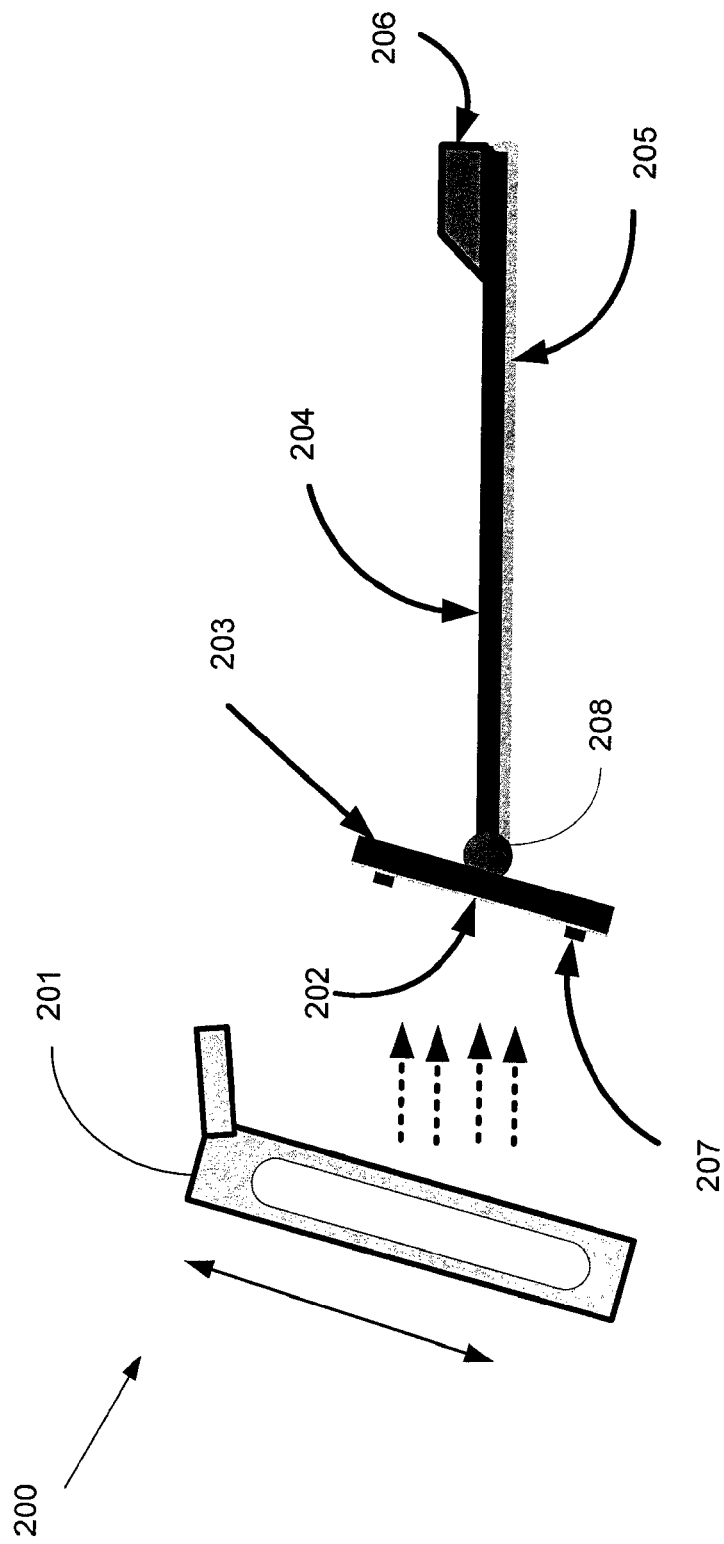
FIG. 3 shows a tail-end weight supported mounting device according to another embodiment of the invention.

FIG. 3 shows a tail-end weight supported mounting device 200 according to another embodiment of the invention. The mounting device 200 comprises a flexible heavy weighted metal neck 204, a weighted block 206 attached to one end of the weighted metal neck 204, and a head 208 attached to the other end. The weighted metal neck 204 is preferably flexible enough to conform to the contours of a dashboard and may comprise steel, lead, etc. The weighted block 206 is preferably weighted to counter balance the weight of the display 201 to be mounted at the front end. The mounting device 200 further includes a magnetic base 203 that can be magnetically attached to the head 208. When magnetically attached to the head 208, the magnetic base 103 can pivot and rotate about the head 208. The mounting device 200 further includes interlocking blocks 207 firmly attached to the magnetic base 203. The interlocking blocks 207 can fit into grooves (shown in FIG. 5) on the back of the display 201, which are discussed in more detail below with reference to FIGS. 5 and 6.

Figure 4:
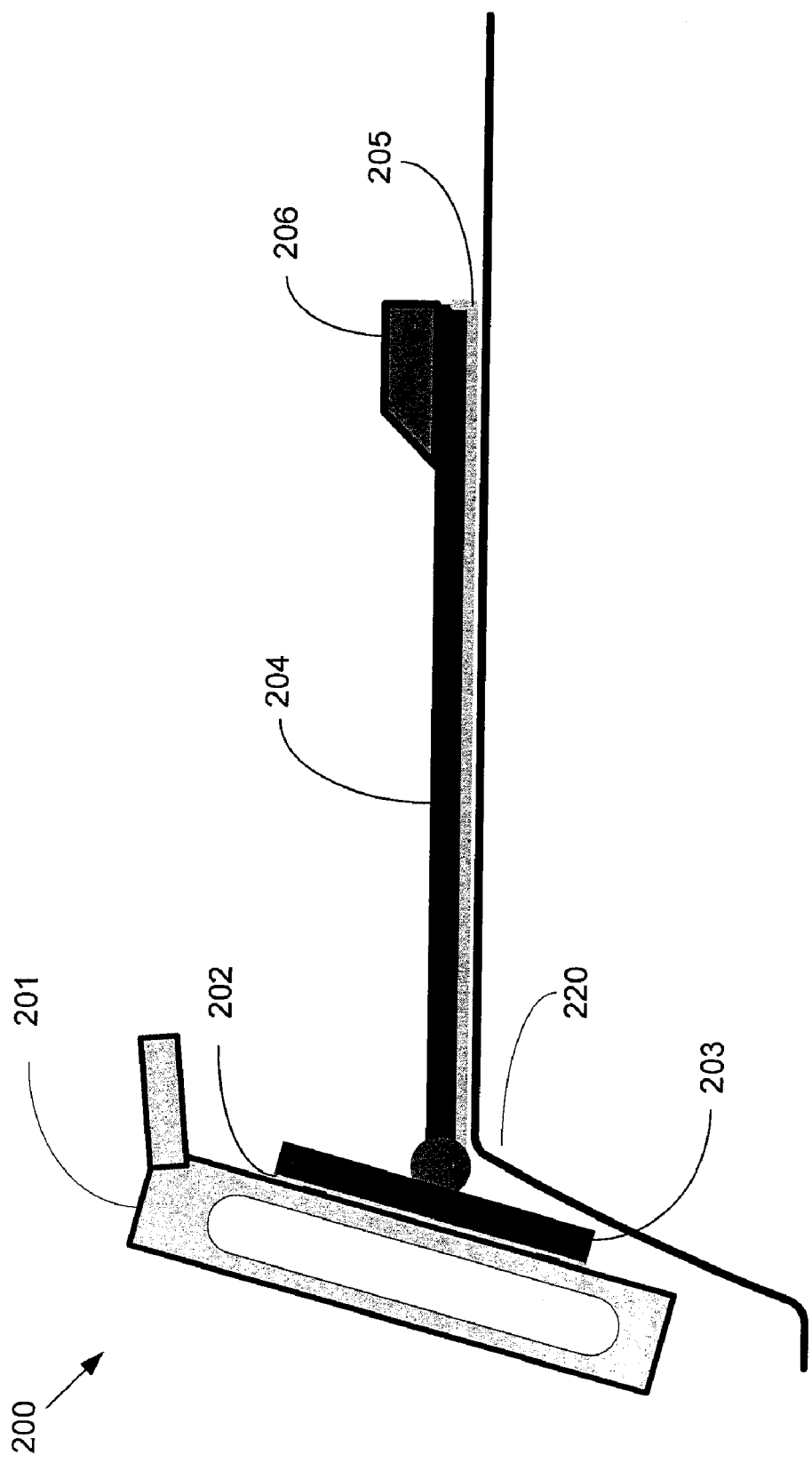
FIG. 4 shows the tail-end weighted supported mounting device attached to the dashboard of a vehicle with a sticky gel pad.

FIG. 4 shows the tail-end weighted mounting device 200 attached to the dashboard 220 of a vehicle. The heavy weighted metal neck 204 conforms to the contours of the dashboard 220 and is preferably attached to the dashboard 220 with a sticky gel pad material. The display 201 is fixed to the magnetic base 203 with a sticky gel pad material 202 in between, and the interlocking blocks 207 on the base 203 fit into grooves on the back of the display 201. The combination of the interlocking blocks 207 and the corresponding groves on the display 201 helps in alignment and in adjusting the mounting height of the display 201, as explained further below. The weighted block 206 provides support for the front-end weight of the display 201 and further helps to provide a stable support. In this embodiment, the display 201 protrudes from the dashboard 220 and there is no need for a rubber pad on the bottom of the display 201.

The tail-end weighted mounting device 200 allows the angle of the display 201 to be easily adjusted along a horizontal plane and a vertical plane.

Figure 5:
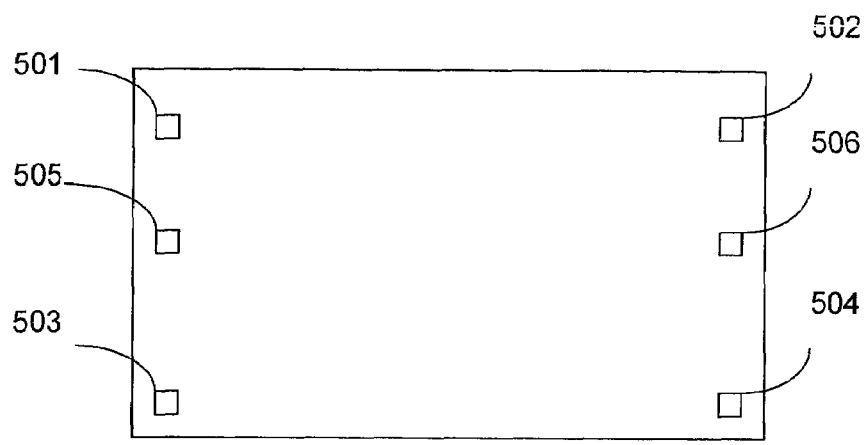
FIG. 5 shows grooves on the back of a display according to an embodiment of the invention.
Figure 6:
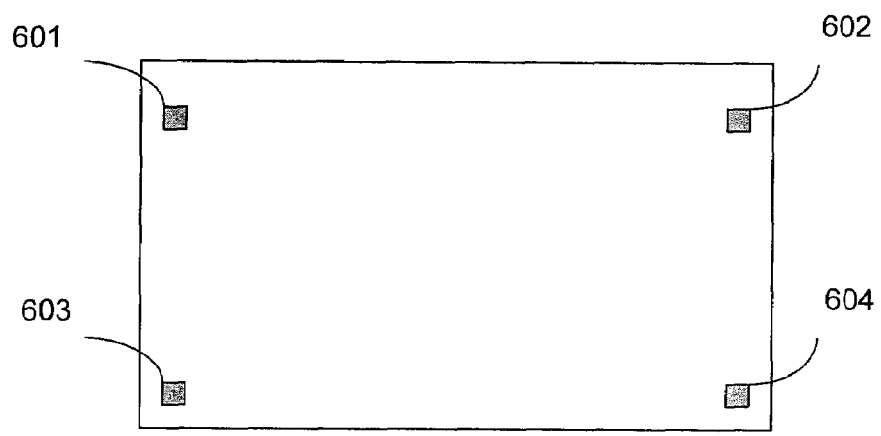
FIG. 6 shows interlocking blocks on the front of a display support base according to an embodiment of the invention.

The interlocking blocks 104 and 207 and grooves will now be described in more detail with reference to FIGS. 5 and 6. FIG. 5 shows the back of a display 500 according to an embodiment. The back of the display 500 includes a set of grooves 501-506. FIG. 6 shows a front view of a display support base 600 having interlocking blocks 601-604 thereon. The display support base 600 may be either magnetic base 103 or 203, and the interlocking blocks 601-604 may be the corresponding interlocking blocks 104 or 207. The interlocking blocks 601-604 can fit into the grooves 501-506 on the back of the display 500 for positioning the display on the support base 600 and for adjusting the mounting height of the display.

For example, the display can be properly positioned on the support base 600 by fitting the interlocking blocks 601, 602, 603 and 604 into the grooves 501, 502, 503 and 504, respectively. The mounting height of the display can be adjusted upward by moving the display up so that interlocking blocks 601 and 602 align with the grooves 505 and 506 with no interlocking with interlocking blocks 603 and 604. The mounting height of the display can also be adjusted downward by moving the display down so that interlocking blocks 603 and 604 align with the grooves 505 and 506. There may be more grooves than shown in FIG. 5 if finer height adjustment is needed. The sticking area of the display with the stick gel pad may be less for certain heights, but still sufficient for a firm hold. Although the interlocking blocks and grooves are shown having rectangular shapes, other shapes may also be used, e.g., circular shapes, as long as the interlocking blocks are dimensioned to fit into the grooves.

Although the present invention has been described in terms of the presently preferred embodiments, it is to be understood that the disclosure is not to be interpreted as limiting. Various alterations and modifications will no doubt become apparent to those skilled in the art after having read this disclosure. For example, although the above embodiments have been described for mounting a display to a vehicle, they can be equally applicable for mounting in non-vehicle uses such as mounting on a picnic table, a survey table, etc. For example, the suction of the mounting device can be suctioned to other smooth surfaces besides the windshield of a vehicle. Accordingly, it is intended that the appended claims be interpreted as covering all alterations and modifications as fall within the spirit and scope of the invention.

What is claimed is:

1. A mounting device comprising:
   a flexible length of material that can be bent in different directions;
   a display or display holder attachable to one end of the flexible material;
   a support attached to the other end of the flexible material;
   interlocking blocks attached to the flexible material; and
   grooves on the back of the display that cooperate with the interlocking blocks for adjusting a mounting height of the display and quickly aligning the display.

2. A mounting device comprising:
   a flexible length of material that can be bent in different directions;
   a cylindrical or spherical head attached to one end of the flexible material;
   a display or display holder magnetically attachable to the head; and a support attached to the other end of the flexible material, wherein the support comprises a weighted block.

3. The mounting device of claim 2, wherein the weighted block can support the weight of the display without any base support.

4. A mounting device comprising:
a flexible length of material that can be bent in different directions, wherein the flexible material comprises a weighted metal neck with a sticky gel pad thereon;
a cylindrical or spherical head attached to one end of the flexible material;
a display or display holder magnetically attachable to the head; and
a support attached to the other end of the flexible material.

5. A method of mounting and adjusting an angle of a display using a mounting device, wherein the mounting device includes a flexible neck and a support attached to one end of the flexible neck, wherein the support is a weighted block, and wherein the mounting device further includes a cylindrical or spherical head attached to the other end of the flexible neck, the method comprising:
attaching the support to a surface;
magnetically attaching the display to the head at the other end of the flexible neck; and
adjusting the angle of the display by bending the flexible neck.

6. The method of claim 5, wherein the surface is the dashboard of a vehicle.

7. The method of claim 6, further comprising fixing at least a portion of the flexible neck on the dashboard of the vehicle such that the display extends beyond the dashboard.

8. The method of claim 7, further comprising fixing the flexible neck to the dashboard with a sticky gel pad material.

9. A method of mounting and adjusting an angle of a display using a mounting; device, wherein the mounting device includes a flexible neck and a support attached to one end of the flexible neck and a magnetic base magnetically attached to the other end of the flexible neck, wherein the display has grooves and the magnetic base has interlocking blocks, comprising:
attaching the support to a surface;
fixing the display to the magnetic base;
aligning the display on the magnetic base by fitting at least one of the interlocking blocks into at least one of the grooves of the display; and
adjusting the angle of the display by bending the flexible neck.

10. The method of claim 9, further comprising adjusting a mounting height of the display by fitting at least one of the interlocking blocks into at least one of the grooves corresponding to a desired mounting height.

* * * * *